(No Model.)
J. T. LEWMAN.
HORSE RAKE.
No. 358,680. Patented Mar. 1, 1887.
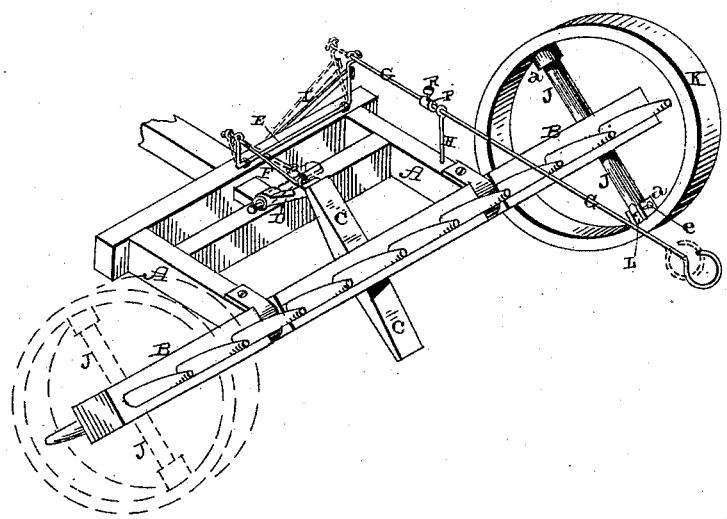
Witnesses.
R. A. Gardner
A. W. Brecht.
Inventor.
J. T. Lewman
per J. A. Lehmann, atty

UNITED STATES PATENT OFFICE.

JOHN T. LEWMAN, OF LEATHERWOOD, INDIANA.

HORSE-RAKE.

SPECIFICATION forming part of Letters Patent No. 358,630, dated March 1, 1887.

Application filed October 26, 1886. Serial No. 217,260. (No model.)

*To all whom it may concern:*

Be it known that I, JOHN T. LEWMAN, of Leatherwood, in the county of Parke and State of Indiana, have invented certain new and useful Improvements in Horse-Rakes; and I do hereby declare the following to be a full, clear, and exact description of the invention, such as will enable others skilled in the art to which it pertains to make and use it, reference being had to the accompanying drawing, which forms part of this specification.

My invention relates to an improvement in horse-rakes; and it consists in, first, the combination of a suitable frame having journaled therein a shaft provided with rake teeth, a rod or bar passing at right angles through the center of said shaft, a stop which is pivoted upon the frame for engaging the rod or bar, a spring-actuated rocking lever which is connected to the stop, and an operating-rod which is connected at its front end to the rocking shaft and has its free end to project beyond the rear of the machine, so as to be readily operated, and a means for holding the catch out of contact with the pin or stop upon the shaft; second, in a horse-rake, the combination, with a suitable frame having journaled therein a suitable shaft provided with teeth, and rods passing through said shaft at each end at right angles to the rake-teeth and to the shaft, of fellies provided with sockets for the rods, and which form spokes for the wheels, one of said sockets having a slot, and a means for preventing the rod from slipping out of the socket, all of which will be more fully described hereinafter.

The object of my invention is to provide a cheap, simple, and durable horse-rake for raking hay, grain, or rubbish, and which can be made to dump its load at any time by operating a rod from the rear of the machine, and to place fellies upon the ends of the revolving shaft, and which virtually form wheels for the machine, so that it can be easily transported from place to place.

The accompanying drawing represents a perspective of a machine embodying my invention, one of the wheels being shown in dotted lines.

A represents the frame of the machine, to which the tongue or shafts are connected in any suitable manner. As shown, the side pieces of the frame extend rearwardly a suitable distance, and have journaled in their rear ends the shaft B, which shaft carries the rake-teeth, which pass through the shaft and extend therefrom upon opposite sides at equal distances. Passing through the center of the shaft, and preferably at right angles to the teeth, is a rod, C. Pivoted upon the frame just in front of the rod C is the stop D, which is made to engage with and disengage from the rod which revolves with the shaft B.

Suitably journaled upon the front piece of the frame A is the rocking shaft E, which is so bent that it extends upwardly at each end a suitable distance. Connecting the inner end of the rocking shaft and the pivoted stop D is the connecting rod or link F, and connecting to the outer end of the rocking shaft is the operating-rod G, which extends to the rear of the shaft B a suitable distance, so that it can be readily operated by the driver, who walks behind the machine.

The operating-rod G is supported above the frame by means of the vertical rod H, having an eye formed in its upper end for the rod G to pass through, and thus guide as well as support it. The pivoted stop D is held in contact with the rod C by means of a spring, I, which bears upon the outer end of the upwardly-projecting arm of the rocking shaft E through the medium of the lever and the link which connects the inner end of the lever and the stop together. When the rod C is engaging the stop, the teeth incline forward, as shown, and thus run under and effectually gather the material being raked.

When it is desired to dump the hay, grain, or rubbish which has been gathered by the teeth, it is only necessary to push the operating-rod G inward, which draws the catch D forward and allows the shaft to partially revolve, relieve the teeth of their load, and bring the opposite ends of the teeth in contact with the ground, to take the place of the teeth which have just discharged their load.

Passing through the shaft B at each of its ends are the rods J, which form spokes for the fellies K, and thus form virtually wheels for the support and easy transportation of the machine. These rods serve the double purpose of causing the shaft B to continue to revolve while the load is being dumped and as spokes of the wheels when the rake is being transported from one place to another. While the machine is being used as a rake the fellies K are not used, and then the ends of the rods J catch against the ground after the shaft has turned partially around, and cause the shaft to continue its revolution, and thus bring the other ends of the teeth into play. By making the rods J of the same length as the rake-teeth the fellies K, when placed upon the rods, raise the shaft far enough above the ground to clear the teeth. The fellies are provided with sockets $a$, as shown, one of which has a lateral opening, L, for the purpose of allowing one end of the rod to be slipped into it after its opposite end has been placed in the closed socket. The rod is held in this slotted socket by means of a pin or bolt, $e$, which passes through holes formed in the socket, and is then secured by means of a nut or in any other desired manner. Both ends of the rod J are rigidly held in the sockets $a$, and hence when the machine is started forward the fellies become wheels and cause the shaft to revolve freely around. When the machine is ready for raking, the fellies are removed from the shaft, and the teeth are allowed to come directly in contact with the ground.

The rods C and J are placed at right angles to, and are preferably of the same length as, the teeth, for the purpose of causing the shaft to continue to revolve when dumping, by coming in contact with the ground while the teeth are in a horizontal position, and bring the opposite ends of the teeth in position for raking. This will also insure a more even revolution of the shaft, and with less labor to the horses, than would be the case if the spoke-rods J were not used and made the same length as the teeth. By placing them at right angles to the teeth they will not interfere with nor obstruct the teeth or the movement of the machine in any manner, which would likely be the case were they placed in a line with the teeth.

When it is desired to transport the machine from place to place, it is only necessary to put the fellies upon the rods and secure them, draw the stop D forward out of contact with the rod C, and lock it in this disengaged position by means of the collar P and set-screw R, when the machine can be drawn the same as a two-wheel machine.

Having thus described my invention, I claim—

1. The combination of the frame A, the shaft B, journaled thereon and provided with rake-teeth, and the stop-rod C, and the pivoted stop D, placed on the frame and made to engage with the rod C, with the rod F, connected to the stop, the rocking shaft having bent ends, the operating-rod G, guide H, through which the rod passes, and a stop, R, on the rod, whereby the stop D can be operated from the rear of the machine and locked out of contact with the rod C, substantially as shown.

2. The combination, in a horse-rake, of a suitable frame, the shaft B, journaled therein and provided with teeth, and the rods J, which are passed through the ends of the shaft, with the fellies K, which are provided with sockets to receive the ends of the rods, and means for securing the rods therein, substantially as described.

In testimony whereof I affix my signature in presence of two witnesses.

JOHN T. LEWMAN.

Witnesses:
FRANK WHITE,
WILLIAM J. WHITE.